Patented Oct. 21, 1941

2,259,543

UNITED STATES PATENT OFFICE 2,259,543

FORTIFIED CEREAL

Howard J. Billings, Acton, Mass., assignor, by mesne assignments, to The Cream of Wheat Corporation, Minneapolis, Minn., a corporation of Delaware No Drawing. Application November 12, 1938, Serial No. 240,051

4 Claims. (Cl. 99—83)

This invention relates to methods of preparing fortifying agents for addition to foods, edible compositions, seasonings and the like, to the agents so prepared, and to the foods fortified therewith.

It is well recognized that the human diet should have adequate amounts of mineral salts of particularly calcium, iron, and phosphorus, as well as relatively minute quantities of copper, manganese and others of the elements. Many foods, however, are deficient or substantially lacking in one or more of these elements, and hence it is frequently true, on diets of limited range of foods that individuals do not obtain a sufficient amount of one or all of them to satisfy the requirements of the body.

Efforts have heretofore been made to overcome these deficiencies by additions of mineral salts to the diet, but the introduction of such compounds into an article of the diet is not generally a simple matter. It is neither convenient, agreeable, nor even desirable to consume minerals as such, and hence the preferable way of introducing them into the human system is as fortifying agents (also referred to as "mineral supplements") in conjunction with ordinary foods. In so introducing these agents, however, there arises the problem of providing a homogeneous mineral addition, including proper relative amounts of minerals therein, and homogeneous incorporation and distribution of such mineral addition in the food product. There also arises the problem of avoiding grittiness and other unpleasant effects in the mouth, and absence of noticeable change in taste, color, odor or appearance of the fortified food product as compared with the unfortified product.

It is, therefore, a principal object of the present invention to provide a method for making fortifying agents of homogeneous composition which contain a suitably balanced proportion of elements, in particular calcium, iron, and phosphorus, so as to present these agents in such a form and character that they are suitable for ready incorporation with foods, and which may be distributed uniformly and homogeneously throughout the food without settling, dusting or segregation during shipment, storage or use of the food with which they are mixed.

Another important object is to provide fortifying agents which, although substantially insoluble in water, are made available to the human system by being in very finely divided form.

It is a further object of the invention to provide an agglomerate of finely divided insoluble particles of mineral particles bound together by a soluble binder, whereby settling, dusting and segregation are avoided.

More specifically, it is an object of the invention to provide an agglomerate having generally the particle size, color and appearance of the food, or other particles to which such agglomerate is added as a mineral supplement.

From another viewpoint it is an object of the invention to provide an agglomerate of fine particles of mineral supplement additions bound together into agglomerate groups by soluble mineral supplement materials.

Still another object is to provide these fortifying agents in such a form that they may be added to granular food products such as cereals which are to be cooked before eating, without changing the general appearance or the taste, color, or odor of the cereal before, during, or after cooking, in comparison with the same cereal unfortified.

Another object is to combine the fortifying agents in a homogeneous manner and yet maintain these agents themselves in such finely subdivided form as to be unnoticeable even between the teeth.

A further object is to provide for the quick-cooking of cereals and like food products in conjunction with the adding of fortifying agents.

Other objects will be evident from the following disclosure.

In its broad aspects, the present invention involves the mixing together of soluble compounds of, for example, iron and calcium, together with a soluble phosphate, in proper proportions, whereby a co-precipitation of the insoluble phosphates of iron and of calcium takes place. Obviously phosphates of other mineral additions, such as copper and manganese, may, if desired, be co-precipitated along with calcium and iron, and it is to be understood that where calcium and iron are specifically mentioned they are merely exemplary of additions which may be used.

The precipitation may be accomplished due to (1) the nature of the anions and cations present, (2) by an alteration of the pH of the solutions used, (3) by varying temperatures or dilutions, or (4) due to an alteration in the salting out effect of the various constituents upon each other, (5) by the use of a water-miscible substance such as an alcohol which disturbs the solubility of the salt in water, (6) by changing the degree of oxidation as when sugar is added to a solution of potassium permanganate, (7) by colloidal coagulation as by the use of silica and alumina gel reactions, or by a combination of one or more of these effects.

The ions associated with the iron, calcium, and phosphate ions in the soluble compounds may or may not contribute valuable characteristics to the fortifying agents; if they do not, they should obviously be harmless to the human system. For example, the hydroxyl ion associated with calcium, together with the hydrogen ion with the phosphate (e. g. calcium hydroxide and phosphoric acid), react to give calcium phosphate and water, which is harmless. Similar starting materials may be used which yield harmless salt by-products.

The resulting co-precipitates filter readily, and dry to a friable cake which is composed of very fine, homogeneous particles, which may be readily brushed through a fine screen, e. g. 200 to 300 mesh. The product so prepared is a fine, dry powder, substantially each particle of which contains the fortifying elements in the proper proportions, and is so finely subdivided that the individual particles are indistinguishable as such between the fingers and between the teeth. Larger particles, even those which can scarcely be felt individually between the fingers, are capable of causing tooth drag, and hence are not only unpleasant but also in some instances undesirably abrasive to the teeth.

The fortifying agent so prepared is not, however, particularly suitable for additions to cereals or other foods because of the difficulty in homogeneously incorporating relatively small amounts (say 2 to 3% on the weight of the food) of such finely divided materials with the relatively larger granules of cereal or other food. When fine particles of fortifying agents are added to cereal or other food, "settling" or "dusting out" occurs, with the result that the food is separated from the fortifying agent especitally on handling. The final food product is frequently not in a homogeneous condition with respect to the admixture of cereal and fortifying agent.

According to the present invention I have been able to overcome this difficulty. In carrying out my invention I incorporate the fortifying agents with a suitable binding material, which in itself may if desired present useful properties such as additional mineral elements and/or may also be a quick-cooking agent to form agglomerates of larger size suitable for adding to cereal or other food. The binding material must be water-soluble or soluble under the conditions met in the body, and when dissolved releases the finer particles for assimulation into the body. Briefly, I mix a solution of the binder thoroughly with the co-precipitated fortifying agent, dry the resulting slurry, and comminute the resulting dried product to say 20 to 60 mesh, or about 50 to 10 times the diameter of the particles of the dried co-precipitated fortifying agent. These sizes are suitable for ordinary crushed granular cereals such as wheat and corn which are intended to be cooked before use. The particle size of these cereals falls in about the same range (specifically about 10 to 40 mesh) as that just given for the ground fortifying agent-plus-binder composition (hereinafter referred to as the fortified agglomerate). The latter, therefore, does not tend to settle out from the mass of granular cereal, and hence can be mixed and remain homogeneously incorporated with the cereal, and be substantially indistinguishable therefrom. When the fortified agglomerate is to be mixed with a colored cereal such as crushed corn (hominy grits) it may be colored to match the cereal, if desired, by adding a suitable coloring agent during its preparation.

Particular features and advantages of the foregoing procedure will now be discussed.

When a mixture of fortifying agents is used, it is generally true that the relative proportions of each differ widely. The determination of the type of ingredients and the proportions is outside the scope of the present invention, which is applicable with equal validity to any formula. It is to be understood, therefore, that the method of the present invention is one of general application, and that a product having any desired ratio of ingredients may be compounded according to my method.

As an example of one type of formula, when calcium and iron salts are used, the former may desirably be present in an amount of about 10 times the latter. Homogeneous mixing of such dissimilar amounts is an extremely tedious and difficult task when the ingredients are dry, and even when they are mixed as a slurry the homogeneity desired in the present process cannot be achieved. The results obtained by co-precipitation are much superior to either the wet or dry mixing of the already-formed solids, for in co-precipitation the solid fortifying agents are precipitated together in uniform admixture in the right proportions from an aqueous solution of original compounds each of which is relatively soluble in water.

As already stated, the binder is a soluble material which is either harmless to the human system or it may itself have special nutrient or even fortifying values. The binder may also advantageously impart quick-cooking properties to any cereal or other food to which it is added. For this type binder, for example, I may add any of the several alkaline compounds set forth in my Patent 2,131,881 which are effective when used in proper amounts to cause quick-cooking of the cereal to which they are added. It is noted that one of these alkaline compounds, disodium phosphate, contains a fortifying substance (phosphate).

There are several ways in which the fortifying agents may be incorporated with the binder to form agglomerates of larger size, but I prefer to carry out this step by adding the binder material in an anhydrous form to the moist precipitate of fortifying materials. Thus when, for example, hydrated disodium phosphate ($Na_2HPO_4 \cdot 12H_2O$) is used as the binder, I add this material in the anhydrous form to the moist precipitate obtained by the co-precipitation step and mix to form the agglomerates. It is desirable that the moisture in the said precipitate should not be in excess of the amount which the anhydrous binder (disodium phosphate) will take up although a slight excess of moisture is not objectionable. If excess moisture is present subsequent drying must be resorted to but it is necessary to carry out this drying at room temperature, and without raising the temperature; otherwise there is considerable tendency to dehydrate the disodium phosphate. There are also other disadvantages to excessive drying, such as dusting of the co-precipitate.

Other methods of mixing the binder and fortifying agent may be resorted to if desired.

Other binders than soluble salts may be used such as, for example, sugars or other flavoring, seasoning or conditioning agents either used alone or in conjunction with other substances. In this manner, also, the pH value of the fortified agglomerate may be maintained within proper bounds to give quick cooking, or indeed to result in no change of cooking rate at all, if desired. For example, when disodium phosphate is used as the binder, and the fortifying agents are phosphates of calcium and iron, the combined alkalinity of all these ingredients, especially when associated in appreciable quantities with the food, may be excessive—in other words, will rapidly cook to a mush because the quick-cooking effect is excessive. To adjust this effect within reasonable limits, the disodium phosphate may be replaced in part with a neutral or slightly acidic substance — conveniently monosodium phosphate, in an amount suitable to give the desired alkalinity and cooking time. Conversely, if greater alkalinity should in some instances be desired, a material such as trisodium phosphate may be used in proper amount. Thus a wide choice of binders is available for selection in accordance with the foregoing.

A particular advantage of the procedure of this invention resides in the fact that the particle sizes of the fortifying agents are not essentially changed during or after their incorporation with the binder. Thus when an agglomerate of say 20 to 30 mesh which is composed of extremely fine insoluble particles held together by a binder, is dissolved, the insoluble material separated out of the agglomerates has substantially the same extremely fine particle size that it had before incorporation with the binder.

Another point of advantage in the present process, particularly with respect to the co-precipitation feature, is the fact that the intimate and homogeneous mixing obtained by co-precipitation is effective in the masking of objectionable taste characteristics of minor constituents of the fortifying agents. For example, the taste of ferric phosphate is objectionable to some people, but when this substance is co-precipitated with a relatively much larger quantity of the relatively tasteless tricalcium phosphate, in accordance with the process of the present invention, the ferric phosphate taste is substantially unnoticeable.

The amount of binder used is not critical although it must ordinarily be kept within reasonable limits which are determined by its characteristics as a constituent of the final fortified food.

Example I

A mixture of 18.5 grams of ferric sulfate ($Fe_2(SO_4)_3$) and 100 grams of 87% phosphoric acid ($H_3PO_4$) is dissolved in about 1 liter of water with heating, if desired. No precipitate forms at this stage although the iron is subsequently precipitated as a phosphate. Calcium hydroxide in the form of a slurry in water is then added until the acid has been fully neutralized, that is to say, until blue litmus paper wetted with the solution remains blue. About 104 grams of calcium hydroxide are required for this purpose, and as neutralization is approached the phosphates of iron and calcium are co-precipitated. The precipitation of the iron phosphate at this time is due to the change in pH of the solution from the rather strongly acidic condition initially maintained due to the ferric sulphate and phosphoric acid, to the neutral condition as gauged by the litmus test. Thus the precipitation of the mineral salt diet fortifying co-precipitate of iron, calcium and the phosphates was in this instance accomplished by the selection of substances present and by regulation of the pH of the solution. Other methods may obviously be used such as by varying the salt effect in a solution by variations of temperature, dilution, or the like. The co-precipitate is then dried to 20 to 24% water, and to 15 grams (dry basis) of the co-precipitated fortifying agent so prepared, there is added 8 grams of anhydrous disodium phosphate ($Na_2HPO_4$) and the mixture is thoroughly stirred until agglomerates are formed. Disodium phosphate may have either 2, 7 or 12 molecules of water depending upon the temperature. The higher the temperature, the fewer molecules of water of crystallization. When a co-precipitate of 20–24% water content is used as described in this example, the disodium phosphate still has considerable potential water-combining capabilities. This is desirable as it helps to keep the product dry. The final dry fortifying agglomerate is then ground to 30 mesh size, and screened.

Example II

To the 15 grams of semi-dry co-precipitate prepared in accordance with the foregoing example there was added 0.68 gram of anhydrous monosodium phosphate and 7.32 grams of anhydrous disodium phosphate. The mixture was then stirred until an agglomerate was formed. The agglomerate was then dried, and ground to a size of between 20 and 30 mesh and screened to uniformity.

The calculated constitution of a typical sample of fortifying agglomerate made in accordance with this example, and wherein a small amount of monosodium phosphate is used, is as follows (weight percentages, anhydrous basis):

| | |
|---|---|
| $Ca_3(PO_4)_2$ | 51.8 |
| $FePO_4$ | 5.9 |
| $CaSO_4$ | 7.6 |
| $Na_2HPO_4$ | 31.6 |
| $NaH_2PO_4$ | 3.1 |
| | 100.0 |

The pH value of this composition is approximately 8.0.

Example III

A cereal product may be compounded by using 100 parts of cereal and from 2 to 3 parts of agglomerate prepared in accordance with either of the foregoing examples. Thus 2.3 parts of the agglomerate prepared in accordance with Example II may be uniformly mixed with wheat cereal which is ground to between 20 and 30 mesh. Since the agglomerate is similarly sized it is maintained in uniform admixture even though severely vibrated, as during packaging, handling and shipping. The pH of the finished cereal, when cooked is about 7.0. By use of more or less alkaline binders or by varying the type of binders used in the agglomerate the cooking rate of the cereal may be regulated. Thus under some conditions acidic binders such as binders comprising mucic, malic, glutamic, or tartaric acids may be used to control the rate of cooking. The more alkaline the conditions are, the quicker the cooking rate will be.

Other cereals may be prepared from corn, barley, oats, or fractions thereof, or from admixtures of the same or fractions thereof with each other, or with wheat or wheat fractions.

It should of course be clearly understood that the foregoing process is not limited to the treatment of granular uncooked cereals; neither is it limited to the use of any particular fortifying agents, or binders. Thus, the fortified agglomerate may, if desired, be used advantageously with other foods, or may be added to seasonings, food ingredients, or the like such as salt, sugar, or flour, which are to be used either in preparing foods such as bread, cakes, pastry and preserves, or even for sprinkling over already-prepared foods prior to eating. Thus a fortified salt composed of 100 parts commercial table salt and from 5 to 20 parts of similarly sized agglomerates gives good results. In such instances the mesh size and the color of the fortified agglomerate may of course be varied to suit the particular conditions of use, but the basic procedure for preparing the fortified agglomerate will remain substantially the same as already described herein.

These and other modifications will be apparent to those skilled in the art and are deemed to be within the scope of the invention described.

I claim as my invention:

1. A raw crushed cereal in granular particle form containing a food fortifying supplement of calcium and iron phosphates comprising agglomerates of about the same size as the cereal particles, each of said agglomerates being composed of a large number of substantially water insoluble particles of less than 200 mesh size of co-precipitated calcium and iron phophates.

2. A quick-cooking, raw cereal in crushed granular form containing a relatively small amount of a fortifying supplement of calcium and iron phosphates comprising an agglomerate of about the same range of sizes as the granular cereal particles and composed of a large number of substantially water insoluble particles of less than 200 mesh size of co-precipitated calcium and iron phosphates bound together with a buffer salt.

3. A raw cereal in granular particle form containing raw crushed granular cereal and a food fortifying supplement comprising a plurality of simultaneously precipitated mineral salts having a particle size sufficiently fine so as not to produce discernible grittiness when masticated, said mineral salt particles being agglomerated into masses having a particle size approximately the same as that of the cereal particles with which the supplement is used.

4. A cereal in granular particle form wherein the particles of a size from about 10 to 40 mesh, and a food fortifying supplement comprising a plurality of simultaneously precipitated mineral salts of a particle size of less than 200 mesh, said mineral supplement particles being agglomerated into masses having a particle size approximately the same as that of the cereal with which they are used.

HOWARD J. BILLINGS.